US008455599B2

(12) United States Patent
Arkles et al.

(10) Patent No.: US 8,455,599 B2
(45) Date of Patent: Jun. 4, 2013

(54) ASYMMETRIC LOW MOLECULAR WEIGHT SILOXANES WITH ONE FUNCTIONAL GROUP

(75) Inventors: Barry C. Arkles, Dresher, PA (US); Edward Kimble, Willow Grove, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 156 days.

(21) Appl. No.: 12/850,028

(22) Filed: Aug. 4, 2010

(65) Prior Publication Data

US 2010/0298591 A1 Nov. 25, 2010

Related U.S. Application Data

(62) Division of application No. 11/928,927, filed on Oct. 30, 2007, now Pat. No. 7,799,888.

(60) Provisional application No. 60/914,436, filed on Apr. 27, 2007.

(51) Int. Cl.
*C08G 77/20* (2006.01)

(52) U.S. Cl.
USPC ............... 526/279; 528/14; 528/32; 528/34; 528/37

(58) Field of Classification Search
None
See application file for complete search history.

(56) References Cited

U.S. PATENT DOCUMENTS

| | | | |
|---|---|---|---|
| 3,578,726 A | 5/1971 | Bostick et al. | |
| 3,974,120 A | 8/1976 | Razzano et al. | |
| 4,839,443 A | 6/1989 | Akutsu et al. | |
| 4,987,203 A | 1/1991 | Saho et al. | |
| 5,016,148 A | 5/1991 | Kohm | |
| 5,039,761 A | 8/1991 | Ono et al. | |
| 5,166,276 A | 11/1992 | Hayama et al. | |
| 5,179,187 A | 1/1993 | Pedain et al. | |
| 5,237,082 A | 8/1993 | Leir et al. | |
| 5,480,634 A * | 1/1996 | Hayama et al. ............ | 424/70.12 |
| 5,672,671 A | 9/1997 | Nakano et al. | |
| 5,719,204 A | 2/1998 | Beach et al. | |
| 6,031,060 A | 2/2000 | Letchford et al. | |
| 6,063,887 A * | 5/2000 | Okawa ........................... | 528/23 |
| 6,271,330 B1 * | 8/2001 | Letchford et al. .............. | 528/14 |
| 6,569,941 B2 | 5/2003 | Sosa et al. | |
| 6,943,203 B2 | 9/2005 | Vanderlaan et al. | |
| 6,991,884 B2 | 1/2006 | Sun et al. | |
| 7,052,131 B2 | 5/2006 | McCabe et al. | |
| 7,074,488 B2 | 7/2006 | Pickering et al. | |
| 2003/0125498 A1 | 7/2003 | McCabe et al. | |
| 2008/0312134 A1 * | 12/2008 | Hirt et al. ........................ | 514/2 |
| 2011/0077422 A1 * | 3/2011 | Hagiwara ..................... | 556/446 |

FOREIGN PATENT DOCUMENTS

| | | |
|---|---|---|
| CN | 1916036 A | 2/2007 |
| EP | 0 679 674 A2 | 11/1995 |
| WO | 97/20851 A1 | 6/1997 |
| WO | 97/20852 A1 | 6/1997 |
| WO | 2006102050 A2 | 9/2006 |
| WO | 2006/138190 A1 | 12/2006 |

OTHER PUBLICATIONS

Abstract for JP 61-151272 (Jul. 1986).*
EP Search Report issued Sep. 14, 2011 in EP Application No. 11157235.0.
Database CA [on line] Chemical Abstracts Service, Columbus, Ohio, US; Lian R. Hutchins, et al.: "Hypermacs: Highly Branched Polymers Prepared by the Polycondensation of AB2 Macromonomers, Synthesis and Characterization" (2005).
M. Scibiorek, et al.: "Controlled Synthesis of Amphiphilic Siloxane-Siloxane Block Copolymers With Carboxyl Functions"; Polymer Bulletin, Springer, Heidelberg, DE; vol. 44; No. 4; pp. 377-384; (2000).
Iskender Yilgor and James E. McGrath, "Polysiloxane Containing Polymers: A Survey of Recent Development", 3.1 Living Anionic Polymerization, vol. 86, pp. 28-30, Polysiloxane Copolymers/Anionic Polymerization, Springer-Verlag (1988).
C. Frye, et al., "Reactions of Organolithium Reagents with Siloxane Substrates", The Journal of Organic Chemistry, vol. 35, No. 5, pp. 1308-1314 (1970).
Roy Anderson, et al., Silicon Compounds: Register and Review, 4th Edition, Petrarch Systems, p. 271, (1987).
Julian Chojnowski Ring-Opening Polymerization of Cyclosiloxanes, Silicon Compounds: Silanes and Silicones, Eds. Arkles & Larson, Gelest, pp. 389-405 (2004).
Georges Belorgey, et al., "Organosiloxane Block and Graft Copolymers", Silicon-Containing Polymers, The Science and Technology of Their Synthesis and Applications, Eds. Jones, Ando & Chojnowski, Kluwer Academic Publishers, Ch. 2, pp. 43-78 (2000).
Ulrich Maschke, et al.: "Synthesis of high-molecular-weight poly(dimethylsiloxane) of uniform size by anionic polymerization, 1 Initiation by a monofunctional lithium siloxanolate"; Makromol. Chem, 193, pp. 2453-2466 (1992).
Barry Arkles: "Look what you can make out of silicones", Silicon Compounds Register and Review, pp. 84-96; Reprinted from CHEMTECH, 13, pp. 542-555 (1983).
Office Action issued Oct. 23, 2009 in U.S. Appl. No. 11/928,927.

* cited by examiner

*Primary Examiner* — Marc Zimmer
(74) *Attorney, Agent, or Firm* — Panitch Schwarze Belisario & Nadel LLP

(57) ABSTRACT

Low molecular weight siloxane materials having one functional group are provided which have reduced tendency to form phase separated domains after polymerization. Two classes of siloxane materials are included: (1) symmetric siloxane macromonomers containing at least two monomer termini and one polymerizable functional group which is equidistant from the termini, and (2) assymetric siloxane macromonomers having at least one polymerizable functional group terminus and at least one oxygen-containing polar hydrophilic terminus selected from the group consisting of hydroxyl, ether, and polyether. Symmetric siloxane macromonomers having hydroxyl termini are useful for forming biocompatible materials, such as for contact lenses, tissue regeneration scaffold polymers, and coatings to reduce non-specific binding of proteins.

1 Claim, No Drawings

ASYMMETRIC LOW MOLECULAR WEIGHT SILOXANES WITH ONE FUNCTIONAL GROUP

CROSS-REFERENCE TO RELATED APPLICATIONS

This application is a divisional of U.S. patent application Ser. No. 11/928,927, filed Oct. 30, 2007, which claims the benefit of U.S. Provisional Patent Application No. 60/914,436, filed Apr. 27, 2007, the disclosures of which are herein incorporated by reference in their entirety.

BACKGROUND OF THE INVENTION

Polydimethylsiloxanes, polyalkylmethylsiloxanes and fluorinated alkylmethylsiloxanes are well known for their hydrophobicity. In a variety of applications it is desirable to incorporate dimethylsiloxane units into other macromolecular structures in order to increase oxygen permeability, release, emollient, or low temperature properties, but a greater degree of hydrophilicity is required in the final polymer compositions. For EXAMPLE, methacrylate functional polysiloxane-based structures can be utilized in pigment dispersion, lithographic, release coating and contact lens applications.

Often, functional low molecular weight polysiloxanes, such as a methacryloxypropyl functional polydimethylsiloxane or 3-methacryloxy-2-hydroxypropyl functional polydimethylsiloxane, are copolymerized with monomers such as methyl methacrylate (MMA) or more polar monomers, such as hydroxyethylmethacrylate (HEMA), glycerylmethacrylate acrylonitrile, dimethylacrylamide, or vinylpyrrolidone. If the polysiloxane domain is too large, particularly with polar monomers, molecular phase separation can occur, reducing mechanical properties or, in cases such as hydrated copolymers, yielding compositions that are cloudy and are not suitable for optical applications. On the other hand, reducing the number of siloxane units to prevent phase separation can make desirable properties, such as those associated with oxygen permeability or surface energy, unachievable.

However, tightly controlled structures with distinct molecular weights can be utilized to achieve these properties by providing the maximum number of siloxane units which do not cause phase or domain separation in the final polymer. More specifically, macromonomers (alternately denoted macromers), polymers having molecular weights of less than 5000, that contain one polymerizeable group, such as methacrylate, acrylate, 3-methacryloxy-2-hydroxypropyl, or vinyl on the alpha and/or omega position of a polydimethylsiloxane have been the preferred starting materials for many pigment dispersion, lithographic and contact lens applications. These macromonomers are formed either directly by terminating an anionic non-equilibrium ring opening polymerization of cyclosiloxanes with a functional chlorosilane, such as methacryloxypropyldimethylchlorosilane, or through intermediates formed by termination with dimethylchlorosilane and then functionalizing by hydrosilylation or additional synthetic steps. This type of polymerization is sometimes referred to as living anionic ring-opening polymerization or "living AROP."

For example, monomethacryloxy-terminated polydimethylsiloxane can be formed by initiating the "living" polymerization of hexamethylcyclotrisiloxane with n-butyl lithium and quenching the reaction with methacryloxypropyldimethylchlorosilane. 3-Acryloxy-2-hydroxypropyl terminated polydimethylsiloxane can be formed by initiating the "living" polymerization of hexamethylcyclotrisiloxane with n-butyl lithium, quenching the reaction with dimethylchlorosilane followed by hydrosilylation with allylglycidyl ether, and finally adding acrylic acid catalyzed by a metal salt such as chromium acetate. Thus, the products of current art are low molecular weight polysiloxanes with a functional group at one terminus and a hydrophobic group derived from the anionic initiator, typically a butyl or methyl group. Patents describing methods which use these macromers as comonomers include U.S. Pat. Nos. 5,166,276; 5,480,634; 5,016,148; 5,179,187; 5,719,204; and 7,052,131.

Most efforts on "living" AROP have been dedicated to forming block co-polymers, as reviewed by I. Yilgor in *Advances in Polymer Science*, 86, 28-30 (1988). C. Frye and others at Dow Corning made the earliest reports on living AROP (see *J. Org. Chem.*, 35, 1308 (1970)). Monomethacryloxypropyl terminated polydimethylsiloxanes produced by "living" AROP, such as the compound shown in structure (I), were first introduced to the US market in *Silicon Compounds Register & Review*, 4th edition, R. Anderson, B. Arkles, G. Larson Eds. Petrarch Systems, p. 271 (1987).

(I)

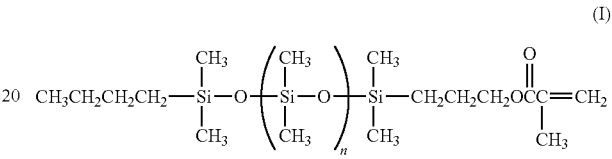

These materials are offered for sale under the trademarks MCR-M11 and MCR-M17 by Gelest Inc. (Morrisville, Pa.). Recent reviews by J. Chojnowski, in "Silicon Compounds: Silanes and Silicones" (B. Arkles, J. Larson, Eds, Gelest, p. 389-405 (2004) and G. Belorgney and G. and Silicones" (B. Arkles, J. Larson, Eds, Gelest, p. 389-405 (2004) and G. Belorgney and G. Sauvet in "Silicon Containing Polymers" (R. G. Jones, Ed; Kluwer, p. 43-78 (2000)) generally refer to this class of materials as ω-monofunctional polysiloxanes.

The general synthetic technique utilized in the prior art is to initiate a living polymerization of a ring-strained cyclotrisiloxane with an alkyllithium or lithium alkyldimethylsilanolate initiator and, after cyclic siloxane monomer is consumed, terminate the reaction via a capping reaction. In other variations, different monomers are fed to the living polymer before termination, or the living polymer may be doubled in molecular weight by coupling with a non-functional material, such as dimethyldichlorosilane.

Monofunctional materials are usually formed directly or indirectly by a capping reaction, i.e., in the case of methacrylate terminated materials, either capping with methacryloxypropyldimethylchlorosilane, as described in U.S. Pat. No. 5,672,671, assigned to Chisso, or by first forming a monohydride-terminated material by capping with dimethylchlorosilane and then performing hydrosilylation with allylmethacrylate. Additionally, monoepoxy terminated compounds, such as those reported in U.S. Pat. No. 4,987,203, assigned to Chisso, have been reacted with methacrylic acid to form 3-methacryloxy-2-hydroxypropyl terminated polydimethylsiloxanes. The expected alternate route achieved by hydrosilylating a hydride terminated polydimethylsiloxane with allyloxyhydroxypropylmethacrylate has also been demonstrated by Parakka et al (see WO 2006/102050). EXAMPLEs of amino-termination and functionalization are provided by Leir et al in U.S. Pat. No. 5,237,082 and Letchford in U.S. Pat. No. 6,031,060. While other monofunctional materials have been reported, such as J. Pickering, et al (U.S. Pat. No. 7,074,488), this technology does not yield linear materials that are monodisperse, but are analogous to what are generally referred to as monofunctional T-resins in silicone technology.

BRIEF SUMMARY OF THE INVENTION

A symmetric siloxane macromonomer according to the invention comprises at least two monomer termini and one polymerizable functional group, wherein the polymerizable functional group is located equidistant from the at least two monomer termini.

An asymmetric siloxane macromonomer according to the invention comprises at least one polymerizable functional group terminus and at least one oxygen-containing polar hydrophilic terminus selected from the group consisting of hydroxyl, ether, and polyether.

DETAILED DESCRIPTION OF THE INVENTION

According to the present invention, low molecular weight (less than about 20,000 Daltons, more preferably less than about 10,000 Daltons) polyalkylmethylsiloxanes are provided that have less tendency to form phase separated domains after polymerization than the monoalkyl monofunctional asymmetric macromonomers of the current art. For the purposes of this disclosure, it should be understood that the terms "low molecular weight polymer," "macromonomer," and "macromer" are synonymous. The macromonomers according to the invention may be symmetric or assymetric and all contain one polymerizable functional group. As described in more detail below, in the symmetric macromonomers, the polymerizable functional group is located equidistant from the monomer termini. In the asymmetric macromers, the polymerizable functional group represents one of the monomer termini.

Preferably, the macromonomers (both symmetric and asymmetric) according to the invention have molecular weights of less than about 20,000 Daltons, more preferably less than about 10,000 Daltons, most preferably about 500 to about 5,000 Daltons. The backbones of the asymmetric and symmetric siloxane macromers may be substituted or unsubstituted polyalkylmethylsiloxanes, including polydimethylsiloxanes, fluorinated polyalkylmethyl siloxanes, polydiphenylsiloxanes and polyphenylmethylsiloxanes. It is also within the scope of the invention to have backbones which contain different "blocks", such as dimethylsiloxane blocks alternating with fluorinated polyalkylmethyl siloxane blocks.

The asymmetric and symmetric siloxane macromoners according to the invention may be formed by polymerizing (via lithium counter-ion initiated living anionic ring opening polymerization) cyclosiloxanes (cyclic monomers) with linear ether, cyclic ether, sulfoxide or formamide promoters and then terminating with functional groups or, in the most preferred embodiments, coupling the living polymers, thereby forming symmetric rather than asymmetric macromonomers. The initiator reacts with the strained cyclic monomer, opening it to create a tight ion pair. The promoter then allows reaction, presumably though complexation or coordination of the ion pair with additional strained cyclic monomers.

There are many possible permutations and combinations of materials possible within the scope of this invention. Initiators which may be utilized include substituted and unsubstituted alkyl and aryl lithium reagents such as, but not limited to methyl lithium, n-butyl lithium, methoxypropyl lithium, t-butyldimethylsiloxypropyl lithium, phenyl lithium, methoxyphenyl lithium, p-t-butyldimethylsiloxyphenyl lithium, p-(bis(trimethylsilylamino)phenyl lithium, lithium phenyldimethylsilanolate, lithium methacryloxypropyldimethylsilanolate, etc. Less effective initiators, such as lithium trimethylsilanolate and phenyl sodium, can also be used, but these are not as effective in generating monodisperse living chains.

Cyclic monomers (cyclosiloxanes) may include, for EXAMPLE, hexamethylcyclotrisiloxane, hexaethylcyclotrisiloxane, triphenyltrimethylcyclotrisiloxane, tris(trifluoropropyl)trimethylcyclotrisiloxane, methoxypropylpentamethylcyclotrisiloxane, etc. The monomers may be used singly to produce homopolymers or in combination to produce block copolymers.

Coupling reagents for the preparation of symmetric macromonomers which are appropriate may include virtually any di- or tri-chloro, fluoro, bromo or iodosilane. Preferred reagents include methacryloxypropylmethyldichlorosilane, acryloxypropylmethydichlorosilane, acrylamidopropylmethyldichlorosilane, vinylmethyldichlorosilane, methacryloxypropyltrichlorosilane, and vinyltrichlorosilane, which lead directly to functional macromers; methyldichlorosilane, bromobutylmethyldichlorosilane, and [(chloromethyl)phenethyl]methyldichlorosilane, which can be converted to methacrylate functional macromers; or aminopropylmethyldifluorosilane and (N-methylaminopropylmethyldifluorosilane), which can be derivatized readily to form, for EXAMPLE, acrylamidopropyl functional polymers. Other potential coupling agents include (vinylphenyl)methyldichlorosilane and (styrylethyl)methyldichlorosilane.

In preferred embodiments of the invention, the initiator is methoxypropyl lithium, t-butyldimethylsiloxypropyl lithium, or p-t-butyldimethylsiloxyphenyl lithium; the cyclic siloxane is hexamethylcyclotrisiloxane or tris(3,3,3-trifluoropropyl)trimethylcyclotrisiloxane; and the quenching or coupling reagent is methacryloxypropylmethyldichlorosilane or acryloxypropylmethyldichlorosilane. The ratio of initiator to cyclic siloxane may be integral, such as 1:1, 1:2, or 1:3 if monodispersivity is desired, or non-integral if monodispersivity is not a requirement. In the cases of the t-butyldimethylsiloxypropyl lithium or the p-t-butyldimethylsiloxyphenyl lithium initiators, the t-butyldimethylsiloxy group may be removed in a subsequent synthetic step to form a hydroxypropyl terminated polymer. The reaction may be performed in non-coordinating solvents, such as cyclohexane, in coordinating solvents, such as tetrahydrofuran, or, with an appropriate promoter, the reaction may be run without solvents (neat).

Using such reagents, it is within the scope of the invention to prepare symmetric macromonomers having polymerizable functional groups selected from, but not limited to, vinyl, methacryloxyalkyl, acryloxyalkyl, acrylamidoalkyl, styryl, hydrogen, and glycidoxyalkyl. The monomer termini may be non-polar and hydrophobic, such as alkyl (methyl, butyl, etc.) and aryl groups, or polar and hydrophilic, such as, but not limited to, hydroxyl, ether, and polyether groups. These polar groups provide the macromonomer with the desirable properties described previously and make them attractive for the production of biocompatible materials.

Assymetric siloxane macromonomers according to the invention preferably contain at least one polymerizable functional group terminus and at least one oxygen-containing, polar hydrophilic terminus preferably selected from the group consisting of hydroxyl, ether, and polyether. Specific groups which may be included as the polymerizable functional group termini have been described above.

Without wishing to be bound by theory, the reduction of the tendency toward phase separation is thought to be from two factors: the introduction of a relatively hydrophilic ether or hydroxyl group derived from the initiator; and the fact that, in the preferred symmetric embodiment, the dimethylsiloxane block is smaller at equivalent molecular weights than an equivalent traditional asymmetric macromonomer. The reduction of the tendency to phase separate in aqueous media may be associated with the fact that the symmetric monomers have smaller hydrodynamic volumes than their asymmetric equivalents. This effect is more significant at low molecular weights. The symmetric macromonomer may be visualized as centering the functionality on the polydimethylsiloxane and "bisecting" the polydimethylsiloxane chain rather than terminating it, thus creating pendants at half its molecular weight.

It is also within the scope of the invention to prepare a macromonomer comprising more than two monomer termini. For EXAMPLE, a trifunctional monomer may couple three "living" polymers. In this case, symmetry may be conceptualized as having a single chain bisected by the coupling molecule and one of the residues of the three "living" polymers, i.e., the center point of the chain has a functional pendant and a pendant of siloxane. The symmetric nature of the polymers may also be achieved by introducing a second substitution at the central part of the macromonomer, as shown, for EXAMPLE, in structure (II), in which the macromonomer has three monomer termini.

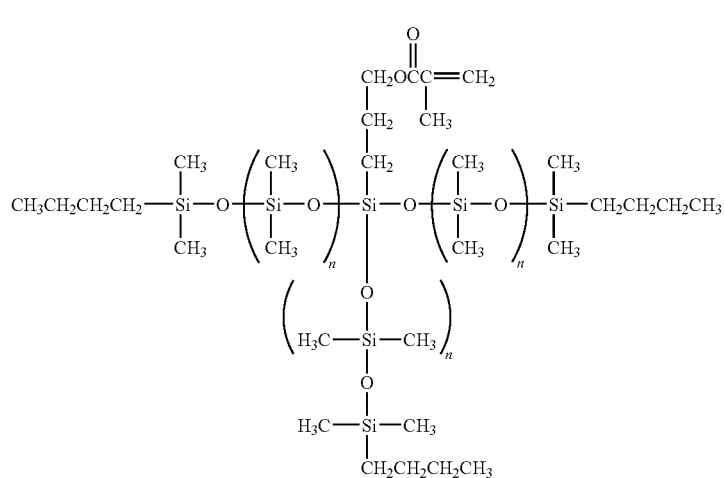

(II)

Both the asymmetric and symmetric macromonomers according to the present invention differ from materials of the art. For EXAMPLE, a polar initiator, such as methoxypropyl lithium, t-butoxypropyl lithium, or methoxyethoxypropyldimethylsilanolate lithium, may be utilized, and the reaction may be terminated by a capping reagent, such as methacryloxypropyldimethylchlorosilane, so as to produce an asymmetric macromer with structure (III), for EXAMPLE, having a polymerizable functional group terminus and a polar hydrophilic terminus.

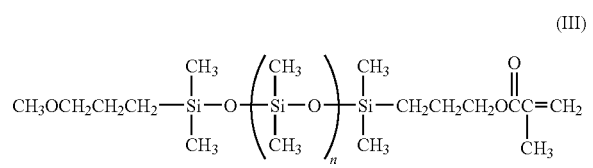

(III)

Alternatively, a single functionality may be introduced by a coupling reagent, such as methacryloxypropylmethyldichlorosilane, so as to produce the symmetric macromer having structure (IV), for EXAMPLE, in which the polymerizable functional group is equidistant from the two monomer termini. In a preferred embodiment, a polar initiator is used in combination with a coupling reagent.

The impact on relative hydrophilicity and the impact on phase separation in hydrophilic domains is dramatic for low molecular weight siloxanes. One explanation is that a nominal 1000 Dalton molecular weight macromonomer has about 10-12 repeating siloxane groups. It is generally considered that six or more dimethylsiloxane groups have an ability to form hydrophobic domains very readily due, not only to the low surface energy associated with the dimethylsiloxane groups, but also to the flexible siloxane backbone which facilitates rapid conformational rearrangement. By placing a relatively polar group at the center of the macromonomer rather than at the terminus, the domain size is held to 5-6 siloxane groups and the facility for conformational rearrangement is reduced. The introduction of polar end-groups further reduces the ability for chain ends to associate by hydrophobic interaction.

In a preferred embodiment of this invention, a symmetric macromonomer with hydroxyl groups at both ends, as shown in structure (V), provides an excellent balance of oxygen permeability, reactivity with comonomers and hydrophilicity compatible with most hydrophilic polymer systems. Monomers of this type are valuable in contact lenses, tissue regeneration scaffold polymers, and coatings that reduce non-specific bonding of proteins or decrease other forms of "biofouling," such as in marine coatings.

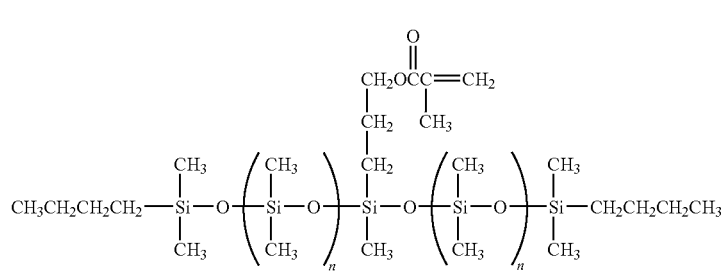

(IV)

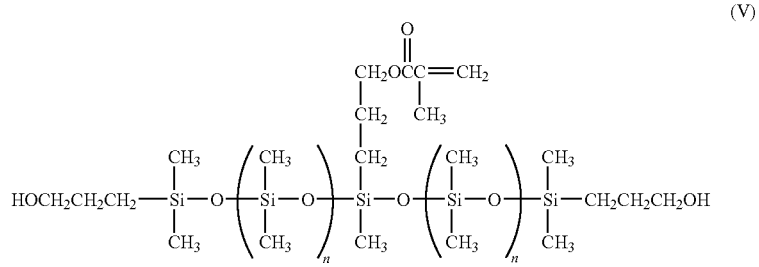

(V)

The invention may be understood in conjunction with the following non-limiting EXAMPLEs.

EXAMPLE 1A

Synthesis of Bis[(n-butyldimethylsiloxy)polydimethylsiloxy]methacryloxypropyl)methylsilane

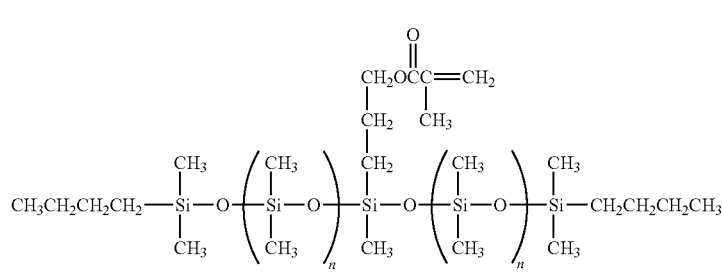

(IV)

A 3 L 4 neck flask equipped with an overhead stirrer, pot thermometer, reflux condenser, water bath and addition funnel was blanketed with nitrogen and charged with 292.8 g (1.316 moles) of hexamethylcyclotrisiloxane and 374.5 g of hexane. A half molar equivalent addition of n-butyllithium (460 ml of 1.64M hexane solution) was made rapidly through the addition funnel. An exotherm was observed (18.7° to 37.5° C.). Thereafter, cooling was used to maintain the temperature below 40° C. The mixture was stirred for one hour and then 107.3 g (1.468 moles) of dimethylformamide (DMF) were added at once. A slight exotherm was observed, pot temperature rose from 24.0° to 29.5° C., and the mixture was stirred for four hours. The coupling reaction was accomplished by adding 0.040 g of p-methoxyphenol (MEHQ), followed by the addition of 88.5 g of methacryloxypropylmethyldichlorosilane over fifteen minutes. Pot temperature rose from 21.7° to 33.2° C. The mixture changed from clear to cloudy and was stirred for an additional 18 hours. Water (924 g) was added to the reaction mixture with stirring and agitated for 15 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (367.5 g) had a theoretical molecular weight of 1085 Daltons, a refractive index) (25°) of 1.4174, a density of 0.932 g/ml, and a viscosity of 9.2 cPs. GPC data (polystyrene st'd without correlation): Mn: 1215, Mw/Mn: 1.24. The structure of the final product is shown in structure (IV).

EXAMPLE 1B

Synthesis of Bis[(n-butyldimethylsiloxy)polydimethylsiloxy](methacryloxypropyl)methylsilane This EXAMPLE is a variation on EXAMPLE 1A. A 3 L 4 neck flask equipped with an overhead stirrer, pot thermometer, reflux condenser, water bath and addition funnel was blanketed with nitrogen and charged with 172.8 g (0.776 moles) of hexamethylcyclotrisiloxane and 401.4 g of hexane. A molar equivalent addition of n-butyllithium (475 ml of 1.64M hexane solution) was made rapidly through the addition funnel. An exotherm was observed (16.0° to 28.0° C.). Thereafter, cooling was used to maintain temperature below 40° C. The mixture was stirred for one hour and then 113.8 g (1.5568 moles) of dimethylformamide (DMF) were added at once. A slight exotherm was observed, pot temperature rose from 19° to 26° C., and the mixture was stirred for four hours. The coupling reaction was accomplished by adding 0.030 g of p-methoxyphenol (MEHQ), followed by the addition of 93.4 g of methacryloxypropylmethyldichlorosilane over fifteen minutes. Pot temperature rose from 15° to 26° C. The mixture changed from clear to cloudy and was stirred for an additional 18 hours. Water (976 g) was added to the reaction mixture with stirring and agitated for 30 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (264 g) had a theoretical molecular weight of 730 Daltons, a refractive index (25°) of 1.4230, a density of 0.929 g/ml, and a viscosity of 5.9 cPs. GPC data (polystyrene st'd without correlation)—Mn: 1012, Mw/Mn: 1.183. The structure of the final product is shown in structure (IV).

EXAMPLE 2
Synthesis of Tris[(n-butyldimethylsiloxy)polydimethylsiloxy]methacryloxypropylsilane

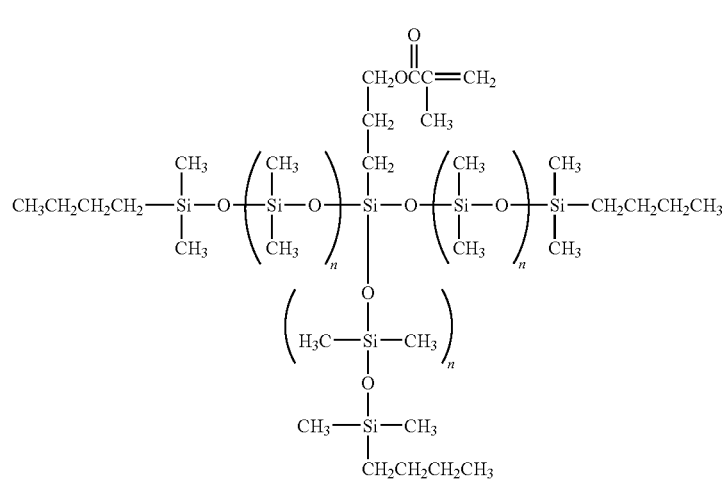

(II)

A 3 L 4 neck flask equipped with an overhead stirrer, pot thermometer, reflux condenser and addition funnel was blanketed with nitrogen and charged with 175.2 g (0.787 moles) of hexamethylcyclotrisiloxane and 394.4 g of hexane. A molar equivalent addition of n-butyllithium (490 ml of 1.64M hexane solution) was made rapidly through the addition funnel. An exotherm was observed (18.2° to 33.5° C.). Thereafter, cooling was used to maintain the temperature below 40° C. The mixture was stirred for one hour, and then 114.4 g (1.565 moles) of dimethylformamide (DMF) were added at once. A slight exotherm was observed, pot temperature rose from 24.6° to 30.2° C., and the mixture was stirred for four hours. The coupling reaction was accomplished by adding 0.03 g of p-methoxyphenol (MEHQ), followed by the addition of 64.0 g of methacryloxypropyltrichlorosilane over fifteen minutes. Pot temperature rose from 20.4° C. to 28.7° C. The mixture changed from clear to cloudy and was stirred for an additional 18 hours. Water (995 g) was added to the reaction mixture with stirring and agitated for 15 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (236.5 g) had a theoretical molecular weight of 994 Daltons, a refractive index (25° of 1.4222, a density of 0.918 g/ml, and a viscosity of 8.2 cPs. GPC data (polystyrene st'd without correlation)—Mn: 1090, Mw/Mn: 1.19. The structure of the final product is shown in structure (II).

EXAMPLE 3
Synthesis of Bis[(t-butyldimethylsiloxypropyl)polydimethylsiloxy](methacryloxypropyl)methylsilane A 3 L 4 neck flask equipped with an overhead stirrer, pot thermometer, reflux condenser, water bath and addition funnel was blanketed with nitrogen and charged with 65.3 g (0.2935 moles) of hexamethylcyclotrisiloxane and 255.6 g of cyclohexane. A molar equivalent addition of 3-(t-butyldimethylsiloxy)-1-propyllithium (310 ml of 0.93M cyclohexane solution) was made rapidly through the addition funnel. An exotherm was observed (20.5° to 30.5° C.). Thereafter, cooling was used to maintain temperature below 40° C. The mixture was stirred for one hour, and then 42.8 g (0.5855 moles) of dimethylformamide (DMF) were added at once. A slight exotherm was observed, pot temperature rose from 22.0° to 26.2° C., and the mixture was stirred for 4 hours. The coupling reaction was accomplished by adding 0.040 g of p-methoxyphenol (MEHQ), followed by the addition of 34.9 g of methacryloxypropylmethyldichlorosilane over fifteen minutes. Pot temperature rose from 18.4° to 31.3° C. The mixture changed from clear to cloudy and was stirred for an additional 16 hours. Water (368.5 g) was added to the reaction mixture with stirring and agitated for 90 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (129.5 g) had a theoretical molecular weight of 960 Daltons, a refractive index (25° of 1.4320, a density of 0.906 g/ml, and a viscosity of 17.2 cPs. GPC data (polystyrene st'd without correlation)—Mn: 1126, Mw/Mn: 1.139. The structure of the final product is shown in structure (VI).

(VI)

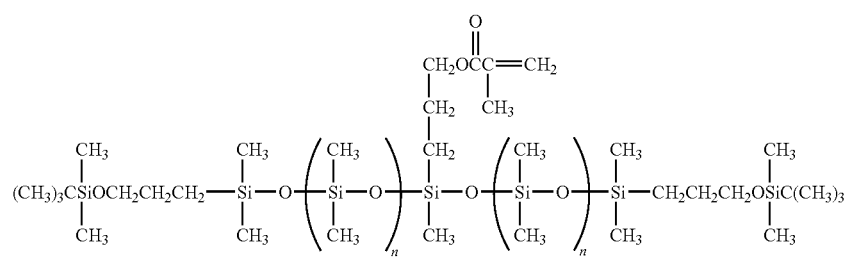

EXAMPLE 4

Synthesis of Bis[(t-butyldimethylsiloxypropyl)poly-dimethylsiloxy]methylhydrosilane

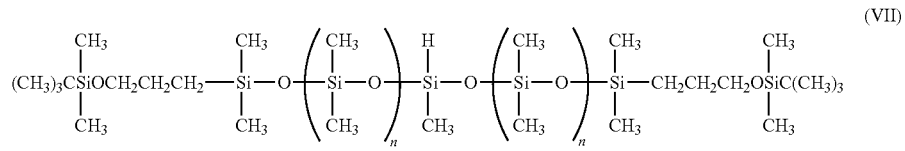
(VII)

A 3 L 4 neck flask equipped with an overhead stirrer, pot thermometer, reflux condenser, water bath and addition funnel was blanketed with nitrogen and charged with 66.3 g (0.3681 moles) of hexamethylcyclotrisiloxane and 252 g of cyclohexane. A molar equivalent addition of 3-(t-butyldimethylsiloxy)-1-propyl lithium (350 ml of 0.93M cyclohexane solution) was made rapidly through the addition funnel. An exotherm was observed (17.8° to 24.0° C.). Thereafter, cooling was used to maintain the temperature below 40° C. The mixture was stirred for one hour, and then 43.8 g (0.5992 moles) of dimethylformamide (DMF) were added at once. A slight exotherm was observed, pot temperature rose from 20.6° to 25.1° C., and the mixture was stirred for four hours. The coupling reaction was accomplished by adding 17.0 g of methyldichlorosilane over fifteen minutes. Pot temperature rose from 20.2° to 32.3° C. The mixture changed from clear to cloudy and was stirred for an additional 16 hours. Water (372.5 g) was added to the reaction mixture with stirring and agitated for 30 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (121.3 g) had a theoretical molecular weight of 836 Daltons, a refractive index (25°) of 1.4245, a density of 0.8974 g/ml, and a viscosity of 10.6 cPs. GPC data (polystyrene st'd without correlation)—Mn: 878, Mw/Mn: 1.142. The structure of the final product is shown in structure (VII).

EXAMPLE 5

Synthesis of Bis[(n-butyl)polytrifluoropropylmethylsiloxy](methacryloxypropyl)methylsilane

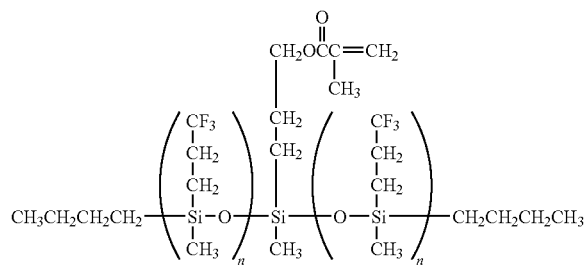
(VIII)

A 3 L 4 neck flask equipped with an overhead stirrer, pot thermometer, reflux condenser, water bath and addition funnel was blanketed with nitrogen and charged with 220.6 g (0.4708 moles) of tris(3,3,3-trifluoropropyl)trimethylcyclotrisiloxane and 253 g of hexane. A molar equivalent addition of n-butyl lithium (280 ml of 1.64M hexane solution) was made rapidly through the addition funnel. An exotherm was observed (20.8° to 31.4° C.). Thereafter, cooling was used to maintain the temperature below 40° C. The mixture was stirred for one hour, and then 68.5 g (0.9371 moles) of dimethylformamide (DMF) were added at once. A slight exotherm was observed, pot temperature rose from 23.5° to 33.2° C., and the mixture was stirred for four hours. The coupling reaction was accomplished by adding 0.020 g of p-methoxyphenol (MEHQ), followed by the addition of 55.6 g of methacryloxypropylmethyldichlorosilane over fifteen minutes. Pot temperature rose from 19.2° to 36.5° C. The mixture changed from clear to cloudy and was stirred for an additional 18 hours. Water (582 g) was added to the reaction mixture with stirring and agitated for 15 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (262 g) had a theoretical molecular weight of 898 Daltons, a refractive index (25°) of 1.3984, a density of 1.094 g/ml, and a viscosity of 52.3 cPs. GPC data (polystyrene st'd without correlation)—Mn: 1487, Mw/Mn: 1.095. The structure of the final product is shown in structure (VIII).

EXAMPLE 6

Synthesis of Bis[(t-butyldimethylsiloxypropyl)poly-dimethylsiloxy]vinylmethylsilane

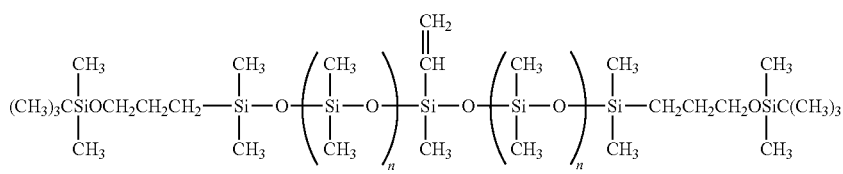
(IX)

A 3 L 4 neck flask equipped with an overhead stirrer, pot thermometer, reflux condenser, water bath and addition funnel was blanketed with nitrogen and charged with 140.8 g (0.6328 moles) of hexamethylcyclotrisiloxane and 344.4 g of cyclohexane. A half molar equivalent addition of 3-(t-butyldimethylsiloxy)-1-propyllithium (340 ml of 0.93M cyclohexane solution) was made rapidly through the addition funnel. An exotherm was observed (10.5° to 31.2° C.). Thereafter, cooling was used to maintain temperature below 40° C. The mixture was stirred for one hour, and then 50.7 g (0.6936 moles) of dimethylformamide (DMF) were added at once. A slight exotherm was observed, pot temperature rose from 20.6° to 22.0° C., and the mixture was stirred for four hours. The coupling reaction was accomplished by adding 22.8 g of vinylmethyldichlorosilane over fifteen minutes. Pot temperature rose from 17.8° to 30.6° C. The mixture changed from clear to cloudy and was stirred for an additional 16 hours. Water (351 g) was added to the reaction mixture with stirring and agitated for 90 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (194.2 g) had a theoretical molecular weight of 1300 Daltons, a refractive index (25°) of 1.4188, a density of 0.899, and a viscosity of 16.9 cPs. GPC data (polystyrene st'd without correlation)—Mn: 1348, Mw/Mn: 1.26. The structure of the final product is shown in structure (IX).

EXAMPLE 7

Synthesis of Bis[(hydroxypropyldimethylsiloxy)polydimethylsiloxy]vinylmethylsilane a peak in the FT-IR at 3335.69 cm$^{-1}$, corresponding to the hydroxyl groups formed on the endcaps of the PDMS chain. The structure of the final product is shown in structure (X).

EXAMPLE 8A

Synthesis of Bis[(n-butyldimethylsiloxy)polydimethylsiloxy]methylsilane

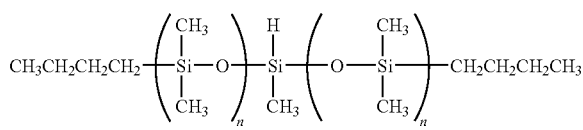

A 3 L 4 neck flask equipped with an overhead stirrer, pot thermometer, reflux condenser, water bath and addition funnel was blanketed with nitrogen and charged with 702.3 (3.16 moles) of hexamethylcyclotrisiloxane and 1590 g of hexane. A molar equivalent addition of n-butyllithium (1930 ml of 1.64M hexane solution) was made rapidly through the addition funnel. An exotherm was observed (14.1° to 28.8° C.). Thereafter, cooling was used to maintain temperature below 40° C. The mixture was stirred for one hour, and then 420 (5.75 moles) of dimethylformamide (DMF) were added at once. A slight exotherm was observed, pot temperature rose from 16.9° to 24.0° C., and the mixture was stirred for four hours. The coupling reaction was accomplished by adding 183.8 g of methyldichlorosilane over fifteen minutes. Pot temperature rose from 19.1° to 39.2° C. The mixture changed from clear to cloudy and was stirred for an additional 18

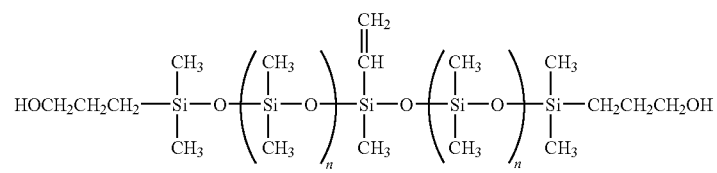

A 500 mL 3 neck flask equipped with an magnetic stirrer, pot thermometer, reflux condenser, heating mantle and addition funnel was blanketed with nitrogen and charged with 180 mL of a solution prepared from 29 g concentrated hydrochloric acid and 971 g of ethanol. 50 mL of the product of EXAMPLE 6 were charged to the addition funnel and added to the pot over a period of 16 minutes. The mixture turned hazy initially, then cleared during the addition. The mixture was stirred at 20-25° C. for 4.25 hours. 4.5 g of sodium bicarbonate was added to neutralize the mixture. The resulting salts were filtered off, and the filtrate was stripped in a rotary evaporator under 10 mmHg vacuum and a maximum temperature of 80° C., removing ethanol and t-butyldimethylsilanol, and then filtered. The resulting oil (36.5 g) showed hours. Water (3982 g) was added to the reaction mixture with stirring and agitated for 90 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (825 g) had a theoretical molecular weight of 590 Daltons, a refractive index (25°) of 1.4086, a density of 0.985 g/ml, and a viscosity of 3.5 cPs. GPC data (polystyrene st'd without correlation)—Mn: 652, Mw/Mn: 1.20. The structure of the final product is shown in structure (XI).

EXAMPLE 8B

Synthesis of Bis[(n-butyldimethylsiloxy)polydimethylsiloxy]glycidoxypropylmethylsilane

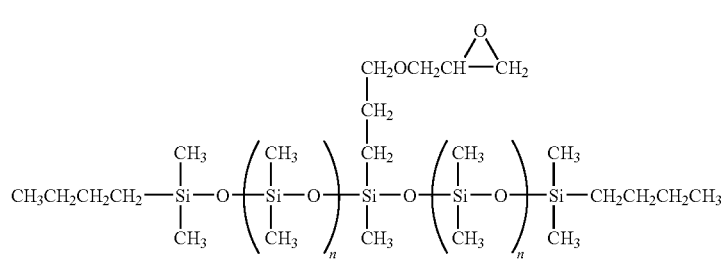

(XII)

A 200 mL 3 neck flask equipped with a magnetic stirrer, pot thermometer, reflux condenser, heating mantle and addition funnel was blanketed with nitrogen and charged with 75.5 g of product of EXAMPLE 8A. The pot was heated to 85.4° C. and 1 g of allylglycidylether was added via syringe along with a catalytic amount of Karstedt's catalyst in xylenes. Another 14.8 g of allylglycidylether was added dropwise from the addition funnel to the pot. An exotherm was observed from 85.4° C. to 100.6° C. An FT-IR scan of the resulting mixture confirmed that no Si—H remained. The pot was stripped to 110° C. and <10 mmHg. The resulting oil (84.5 g) had a theoretical molecular weight of 717 Daltons, a refractive index (25°) of 1.4232, a density of 0.90779 g/ml, and a viscosity of 7.5 cPs. GPC data (polystyrene st'd without correlation)—Mn: 753, Mw/Mn: 1.22. The structure of the final product is shown in structure (XII).

EXAMPLE 9

Synthesis of α-(n-butyltrifluoropropylmethylsiloxy)-ω-(methacryloxypropyl)dimethylsiloxy terminated poly(trifluoropropylmethyl)siloxane

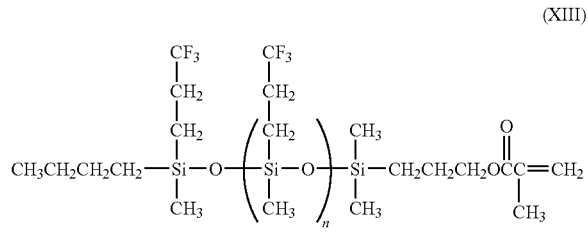

(XIII)

A 5 L 4 neck flask equipped with an overhead stirrer, pot thermometer, reflux condenser, water bath and addition funnel was blanketed with nitrogen and charged with 989.8 g (2.112 moles) of tris(3,3,3-trifluoropropyl)trimethylcyclotrisiloxane and 720.8 g of hexane. A half molar equivalent addition of n-butyllithium (645 ml of 1.64M hexane solution) was made rapidly through the addition funnel. An exotherm was observed (20.6° to 31.5° C.). Thereafter, cooling was used to maintain the temperature below 40° C. The mixture was stirred for one hour, and then 67.1 g (0.92 moles) of dimethylformamide (DMF) were added at once. A slight exotherm was observed, pot temperature rose from 18.4° to 28.9° C., and the mixture was stirred for four hours. The capping reaction was accomplished by adding 0.040 g of p-methoxyphenol (MEHQ), followed by the addition of 233.7 g of methacryloxypropyldimethylchlorosilane over 20 minutes. Pot temperature rose from 19.2° to 25.9° C. The mixture changed from clear to cloudy and was stirred for an additional 16 hours. Water (1032 g) was added to the reaction mixture with stirring and agitated for 15 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mm Hg vacuum to a maximum pot temperature of 60° C. The resulting oil (1043 g) had a theoretical molecular weight of 855.5 Daltons, a refractive index (25°) of 1.3959, a density of 1.1559 g/ml, and a viscosity of 62.2 cPs. GPC data (polystyrene st'd without correlation): Mn: 1662, Mw/Mn: 1.454. The final product had structure (XIII).

EXAMPLE 10

Synthesis of Bis[(hydroxydimethylsiloxy)polydimethylsiloxy]methacryloxypropylmethylsilane A 500 mL 3 neck flask equipped with a magnetic stirrer, pot thermometer, reflux condenser, heating mantle, and addition funnel was blanketed with nitrogen and charged with 180 mL of a solution prepared from 29 g concentrated hydrochloric acid and 971 g of ethanol. 50 mL of the product of EXAMPLE 5 were charged to the addition funnel and added to the pot over a period of 16 minutes. The mixture turned hazy initially, then cleared during the addition. The mixture was stirred at 20-25° C. for 1 hour. 4.8 g of sodium bicarbonate was added to neutralize the mixture. The resulting salts were filtered off, and the filtrate was stripped in a rotary evaporator under 10 mmHg vacuum and a maximum temperature of 70° C., removing ethanol and t-butyldimethylsilanol, and then filtered. The resulting oil (40.8 g) showed a peak in the FT-IR at 3347.31 cm$^{-1}$ corresponding to the hydroxyl group formed on the endcaps of the PDMS chain.

EXAMPLE 11

Synthesis of Bis[(n-butylrifluoropropylmethylsiloxy)poly(trifluoropropylmethylsiloxane)-block-poly(dimethylsiloxy](methacryloxypropyl)methylsilane

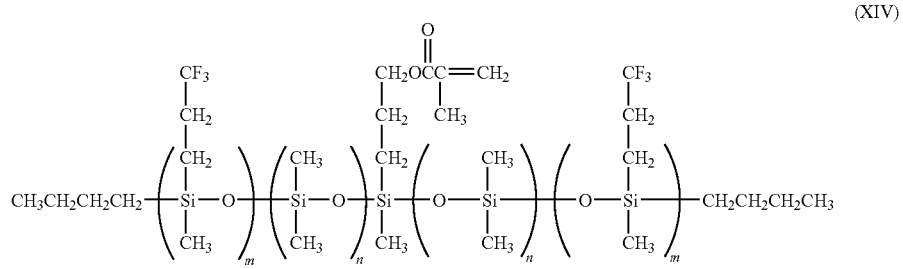

(XIV)

A 5 L 4 neck flask equipped with an overhead stirrer, pot thermometer, reflux condenser, water bath and addition funnel was blanketed with nitrogen and charged with 695.2 g (1.484 moles) of (3,3,3-trifluoropropyl)methylcyclotrisiloxane and 418 g of hexane. A molar equivalent addition of n-butyllithium (930 ml of 1.60M hexane solution) was made rapidly through the addition funnel. An exotherm was observed (16.7° to 41.6° C.). Thereafter cooling was used to maintain temperature below 40° C. The mixture was stirred for one hour and then 217 g (2.968 moles) of dimethylformamide (DMF) were added at once. An exotherm was observed, pot temperature rose from 20.3° to 38.9° C., and the mixture was stirred for two hours. Then, 336.1 g (1.511 moles) of hexamethylcylcotrisiloxane dissolved in 372 g of hexane were added, pot temperature rose from 20.9° to 21.3° C., and the mixture was stirred for three hours. The coupling reaction was accomplished by adding 0.15 g of p-methoxyphenol (MEHQ) followed by the addition of 179.2 g of methacryloxypropylmethyldichlorosilane over 10 minutes. Pot temperature rose from 22.5° to 35.9° C. The mixture changed from clear to cloudy and was stirred for an additional 16 hours. Water (300 g) was added to the reaction mixture with stirring and agitated for 15 minutes. The contents of the flask were separated into aqueous and non-aqueous layers in a separatory funnel and the aqueous layer was discarded. The organic layer was dried over anhydrous sodium sulfate, filtered, transferred to a rotary evaporator and stripped under 10 mmHg vacuum to a maximum pot temperature of 60° C. The resulting oil (1057 g) had a theoretical molecular weight of 1343 Daltons, a refractive index (25°) of 1.3991, a density of 1.094 g/ml and a viscosity of 35.8 cPs. GPC data (polystyrene st'd without correlation): Mn: 1729, Mw/Mn: 1.28. The final product had the structure (XIV).

EXAMPLE H-1

Hypothetical Example

Synthesis of Bis[(phenyldimethylsiloxy)polydimethylsiloxy]vinylmethylsilane

A 3 L 4 neck flask equipped with an overhead stirrer, pot thermometer, reflux condenser, water bath and addition funnel is blanketed with nitrogen, and is charged with 333.0 g (1.5 moles) of hexamethylcyclotrisiloxane, and heated to 80° C. A half molar equivalent addition of phenyllithium (290 ml of 2.6M in cyclohexane solution) is then added rapidly through the addition funnel. The mixture is agitated until homogeneous and then 2 ml of diglyme are added. An exotherm is observed (100° to 135° C.). The mixture is stirred for four hours without heating. 125 ml of toluene are added and then the mixture is heated to 60° C. and stirred until the mixture appears homogeneous and then is allowed to cool to 40-45° C. The coupling reaction is accomplished by adding 0.040 g of p-methoxyphenol (MEHQ), followed by the addition of methacryloxypropylmethyldichlorosilane. The mixture changes from clear to cloudy and is stirred for an additional 16 hours. Water (500 g) is added to the reaction mixture with stirring and agitated for 15 minutes. The contents of the flask are separated into aqueous and non-aqueous layers in a separatory funnel and the aqueous layer is discarded. The mixture is agitated a second time with water. The organic layer is dried over anhydrous sodium sulfate, filtered, transferred to a rotary evaporator and stripped under 10 mm Hg vacuum to a maximum pot temperature of 60° C.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An asymmetric siloxane macromonomer comprising at least one polymerizable functional group terminus and at least one oxygen-containing polar hydrophilic terminus, wherein the macromonomer has formula (III):

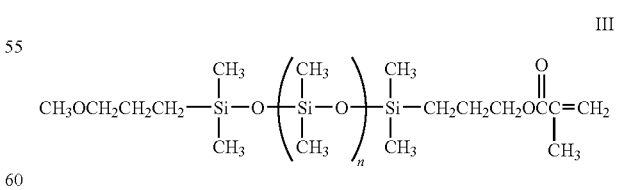

III wherein n represents the degree of polymerization, and wherein the macromonomer has a number average molecular weight of about 500 to about 5,000 Daltons.

\* \* \* \* \*